(12) United States Patent
Arias Lopez

(10) Patent No.: US 7,494,405 B2
(45) Date of Patent: Feb. 24, 2009

(54) METHOD AND APPARATUS FOR THE AUTOMATIC STUFFING OF MEAT PRODUCTS INTO A DOUBLE CASING COMPRISING A SHEET AND A NET

(75) Inventor: Juan Arias Lopez, Pamplona (ES)

(73) Assignee: Viscofan, S.A., Pamplona (ES)

( * ) Notice: Subject to any disclaimer, the term of this patent is extended or adjusted under 35 U.S.C. 154(b) by 970 days.

(21) Appl. No.: 10/503,674

(22) PCT Filed: Feb. 6, 2002

(86) PCT No.: PCT/ES02/00054

§ 371 (c)(1),
(2), (4) Date: Sep. 14, 2004

(87) PCT Pub. No.: WO03/066440

PCT Pub. Date: Aug. 14, 2003

(65) Prior Publication Data

US 2005/0126403 A1 Jun. 16, 2005

(51) Int. Cl.
*A22C 11/00* (2006.01)
(52) U.S. Cl. .................................................. 452/32
(58) Field of Classification Search ............. 452/30–32, 452/35–37, 46–48, 51
See application file for complete search history.

(56) References Cited

U.S. PATENT DOCUMENTS

| | | | | | |
|---|---|---|---|---|---|
| 3,726,059 | A | * | 4/1973 | Cherio et al. | 53/64 |
| 4,640,083 | A | * | 2/1987 | Takahashi et al. | 53/551 |
| 4,956,893 | A | * | 9/1990 | Townsend | 452/32 |
| 4,958,477 | A | * | 9/1990 | Winkler | 53/138.3 |
| 2005/0066508 | A1 | | 3/2005 | Pinto et al. | |

* cited by examiner

*Primary Examiner*—Thomas Price
(74) *Attorney, Agent, or Firm*—Notaro & Michalos P.C.

(57) ABSTRACT

Based on a conventional installation including a stuffing-portioning machine (1) and a fast clipper (2), duly synchronised, between which is established a shaping device (3) that converts the film (5) meant to wrap food products that is supplied in the form of a coil into a tubular element that can be coupled to the stuffing tube (3), on which is coaxially mounted a second tube (8) bearing an external casing (9) based on a tubular net, the invention consists of using tubes (4) and (8) with a small diameter, much smaller than that of the finished product, so that the film (5) is adapted to the tube (4) after the former is profusely folded longitudinally, while the small diameter of the tube (8) allows the multilayer shirring of the tubular net (9), using the pressure provided by the pumping system of the stuffing machine (1) to achieve the radial expansion of the film (5) and the tubular net (9) to obtain the final diameter of the finished product, which will vary according to the speed with which it is separated from the double clipper (2) carried by a conveyor belt (12) with an adjustable speed.

13 Claims, 6 Drawing Sheets

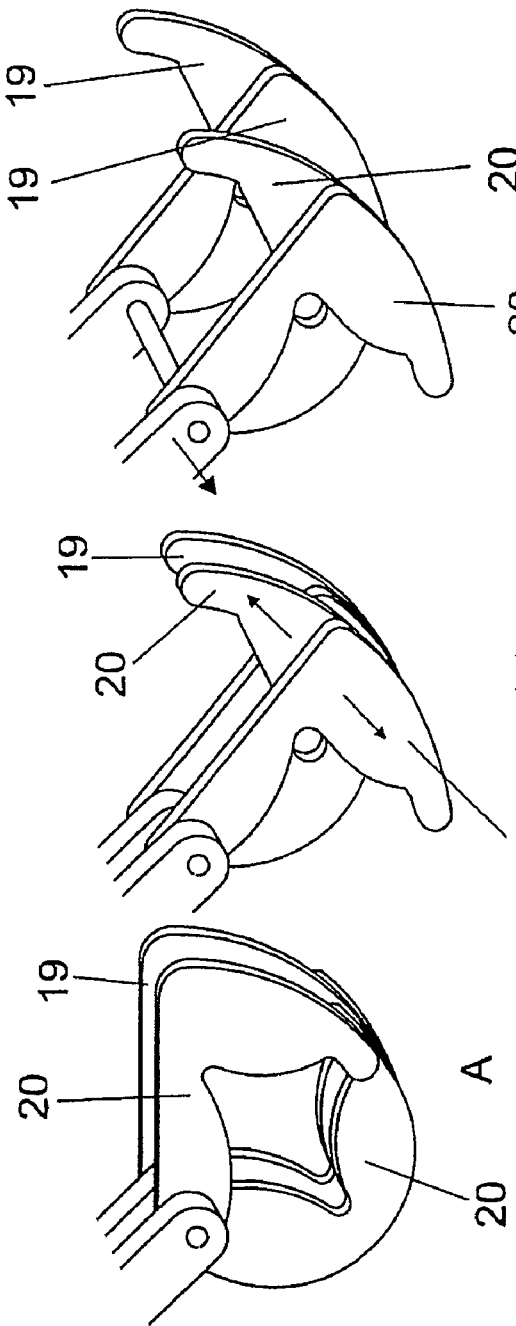
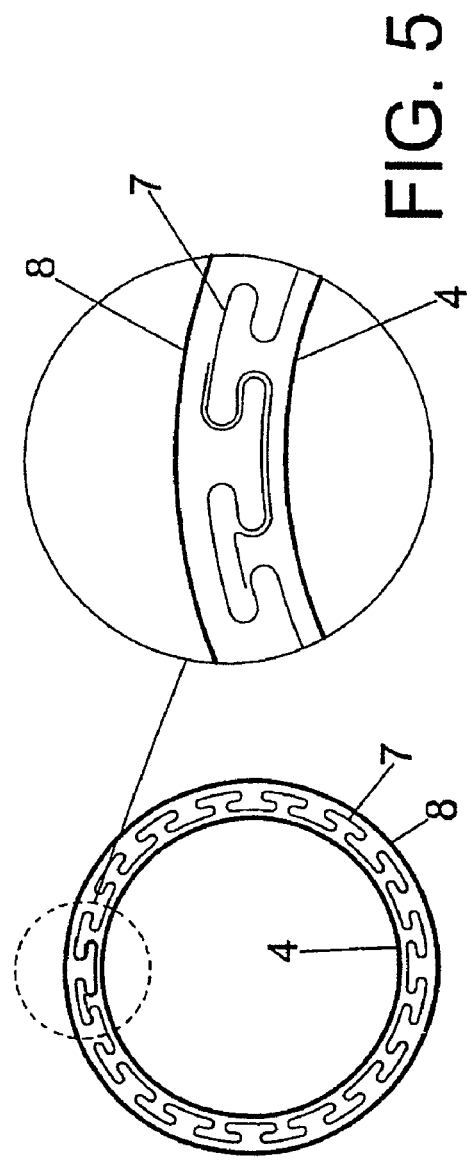
FIG. 4
FIG. 5

METHOD AND APPARATUS FOR THE AUTOMATIC STUFFING OF MEAT PRODUCTS INTO A DOUBLE CASING COMPRISING A SHEET AND A NET

OBJECT OF THE INVENTION

The present invention relates to an automatic method for fully packaging meat products in a dual casing, which internally consists of any type of edible or inedible film and externally consists of an elastic tubular net, and also relates to the device for executing said method.

The present invention consists of a method for stuffing in a double film and net casing in which the meat product is passed through a tube with a small diameter, independent of the size of the finished product and considerably smaller than it. The inner part of the double casing consists of the film, which has overlapping edges and forms a cylinder around the tube with a small diameter, adapting itself to the latter by longitudinal folds. The net tube constituting the outer part of the double casing also has a small diameter, which has two effects: on one hand, the full automation of the system to increase its speed considerably as it allows using a conventional stuffing-proportioning machine coupled to a double clipper, fast and conventional as well as duly synchronised with the first machine; and on the other hand, a greater loading capacity of the tubular net, with the resulting increase in system autonomy, while feeding the film continuously from a coil.

The diameter of the final product is obtained from the pressure communicating the stuffing machine pumping system and as a function of the speed with which the stuffed product moves away from the stuffing device.

BACKGROUND OF THE INVENTION

The present invention mainly corresponds to the field of food product packaging, more specifically to the meat product industry. There are a great variety of products wrapped in film for processing, handling and/or conservation. The use of a film is often complemented with a tubular net and finds a specific application in special products in which the appearance of the product is important.

The film and net assembly form a casing in which the main purpose of the film is to contain liquid parts, prevent excessive evaporation during the heat process, allow smoking, provide shine, colour and appearance to the product surface, facilitate elimination of the net and of the film itself if it is not edible, and must also be soft enough to allow the net to transmit its imprint on the product, giving it a characteristic appearance. The use of the film and net also allows using chopped meat and meat parts of various sizes and qualities, even meat emulsions and fine pastes, alone or mixed with the former in various proportions, as the film and net assembly confines and holds inside it the stuffed product until it coagulates and binds in the heat process, thereby allowing the manufacture of reconstituted meat products.

Films and tubular nets are currently applied in the food industry manually and mechanically. For this purpose, the films are supplied in cut sheets or in coils of greater or lesser length, ranging from 5 to 250 meters. Nets are supplied as rolls with minimum lengths of about 50 meters. A manual form of application consists of wrapping the food product with the films and covering it with the net, making it pass through the inside of a hollow metal cylinder or tube that supports a given amount of tubular net axially shirred or compressed on it, obtaining on the opposite end of the cylinder the product with the net that in this manner will cover it. This procedure is described in U.S. Pat. No. 4,621,482 (Crevasse, Gammon, Sullivan 1986). An even simpler procedure is described in U.S. Pat. No. 4,719,116 (Crevasse 1988).

The mechanical process is performed by "applicators", which wrap the product simultaneously with the film and net. A typical applicator comprises a film-coil bearing roller, a device for conforming a cylinder with the film and a tube running inside the film tube formed through which the food product is made to pass. A tube is placed concentrically to this assembly in which a given quantity of net has been compressed. The end of the tube formed by the film and the end of the compressed net portion are taken jointly in front of the open end of the stuffing tube and jointly closed with a clip, knot or any suitable system, so that the system is left ready to be stuffed wither by mechanical pumping or by a manually or pneumatically actuated piston. When the product is pushed out of the tube it simultaneously pulls the film and tubular net, thereby being wrapped by both. This procedure and the device for performing it are respectively described in the U.S. Pat. No. 4,910,034 (Winkler 1990) and U.S. Pat. No. 4,958,477 (Winkler 1990). Devices for compressing the nets are also described in U.S. Pat. No. 5,273,481 (Sullivan 1993) and U.S. Pat. No. 4,924,552 (Sullivan 1990).

The full meat product packaging procedure in which the described applicators participate is comprised of the following operations:
Feeding the meat.
Pushing the meat through the tube.
Holding and shaping the piece being stuffed.
Cutting the casing.
Clipping or stapling the ends.
Extracting the stuffed piece.
Piercing the casing to eliminate air bubbles.

These operations are in general performed in three different manners according to the type of applicator, stapling or clipping machine used and the extent of mechanisation required. The systems used are:
Systems with manual feeding and clipping.
Systems with automatic feeding and manual clipping.
Systems with automatic feeding and clipping.

The first system is the least mechanised of the three and uses a piston applicator. After the product is stuffed it is manually collected by the other end of the tube, which is coated in the double casing, while it is pulled to thus provide he required amount of double casing. After the entire product has left the tube and it is fully covered in the double casing, the latter is held by its rear part and cut. After it is cut the piece is shaped by pressing the meat in the casing until it has the required tension and the two ends are clipped or stapled in a simple manual clipper normally located nearby. The operation is completed with the manual piercing of the film surface to eliminate air trapped during the stuffing and placing the stuffed pieces in the cart where they will be cooked. This system is the slowest of all and requires the highest manpower. One person is needed to feed the meat, another to hold and shape it and a third to clip and pierce it. The production rate is therefore generally less than 4 pieces per minute.

The second system uses a mechanical pumping applicator. The meat tube is coupled on its rear by a suitable connection system to a stuffing machine that pumps a programmed amount of meat product each time. This procedure has obvious advantages over the previous one. The first one is that uniform amounts of meat are impelled each time, the operator only having to press a button or step on a pedal, and that the amount of air trapped in the stuffed product is less, as the meat tube is always full of meat and it can only be accessed through the space between the meat tube and the net tube, this is, through the space in which the film runs. The subsequent operations of holding and shaping the pieces, cutting, clipping or stapling the ends and piercing the pieces are as described for the previous case, with the only added difficulty that as the tube remains full of meat the operator must manually strangle the stuffed piece at the end of the stuffing tube, separating the meat mass and pulling on the double casing until enough of it is exposed to cut and/or clip it, according to the method employed. The rate of this system is somewhat higher, around 5 parts per minute, and the operation can be performed by only 2 persons, one to hold, shape and cut the piece and the other to clip and pierce it.

The third system automates the feeding, pushing, shaping, clipping and cutting operations of the pieces, but not their piercing to eliminate the air. Although in the previous systems the applicators may be used with several types of stuffers and/or clippers, in this case the system constitutes an assembly integrated in a single machine that includes portioning, pushing, separation and clipping. The product is fed by an applicator coupled to a stuffing machine, with the difference that the impulsion piston is pneumatically actuated. At the outlet of the meat stuffing tube is placed the holding, shaping, cutting and clipping mechanism, which consists of a system with two pairs of double clamps, in between which is the stapler. The sequence of operations is as follows: after the meat piece has been placed inside the stuffing tube, the first pair of clamps placed immediately after the end of the stuffing tube opens to allow the latter to pass between them and through the clipper until it reaches the second pair of clamps, which are open, but not surpassing them so that the second pair can close without being hindered by the tube. The end of the tube is already closed by he double casing held by a clip. Then the piston that pushes out the meat from the tube covered by the double casing is triggered. When the piston recedes the second pair of clamps closes, strangling and holding the double casing immediately after the stuffed meat mass. At this time he tube recedes to its initial position, thereby releasing an amount of double casing with a length equivalent to this recession movement, the first pair of clamps closing to hold and collect the double casing at its height so that the stapling machine can place a pair of staples in the area included between the double clamps, simultaneously cutting the double casing between them. The piece formed in this manner resting on an inclined path of freely turning rollers falls under gravity, exiting the machine, where an operator pierces it and places it on the cart where it will be cooked. The advance of the tube between the clamps before the meat is pushed is necessary to prevent the product from colliding against these when it is stuffed and to allow the second pair to strangle the double casing, enclosing all the stuffed meat. This requires sizing the system in correspondence with the meat tube diameter. This system is the fastest of the three and can reach a rate of 6 to 7 pieces per minute, with an operator collecting and piercing the pieces, assisted part of the time by another that loads the net. The second operator normally attends to two machines, so that one can say that each machine requires 1.5 operators. This system saves double casing due to the automatic product shaping carried out by the clamps, as the piece tail ends are short and constant, their length being determined by the distance between the two pairs of clamps, which is constant. Although this system automates all stuffing operations, their rate cannot exceed 7 parts per minute as the sequence of operations described is very slow. This slowness is due to the size and weight of the moving parts, clamps, advancing and receding tube, piston, clipping machine, etc. and to its pneumatic actuation. Additionally, the machine is expensive and specific to this type of products.

Regardless of the system used, it is common to add to all the aforementioned operations the passage of the finished parts through a vacuum chamber as a complement to piercing, to help eliminate the air trapped during the stuffing, which causes important problems affecting the external appearance of the finished product and resulting in significant financial losses. This operation requires an additional operator.

In all of the above cases the diameter of the tubes through which the meat is passed is similar to that of the final product after it is closed, clipped or stapled. This implies that the cylinder formed by the film around the meat tube has a diameter similar to that of the final product and that the elastic net shirred on the outer tube is extended to the degree that it will be in the final product. The reason for this is that in this way the pouch or bag shaped assembly formed by the film and the net is open at its maximum extension and offers a lower resistance to be filled with the meat. This procedure is not lacking weak points that could be improved:

The systems hitherto developed have not attained a full and efficient automation for processing products stuffed in a double film and net casing. Machines have been developed, such as that previously described in the third system, both for stuffing entire muscles or large pieces of meat and for reconstituted products that also staple or clip the pieces automatically, but these machines are specific for this operation, as well as slow, large and costly, as they are designed to perform the separation and clipping operations of stuffed pieces through tubes whose diameter is similar to that of the finished piece. This means that it is necessary to perform the slow sequence of operations previously described, which requires a specific complex machine, large and costly. The system solves some of the drawbacks inherent to this type of elaboration, but the operation continues to be slow, not above seven pieces per minute, and the stuffed products include a great amount of surface air that is difficult and never completely eliminated.

In addition, this system does not allow a continuous stuffing that keeps the tube full of meat, as the clamps would have to close on too large a diameter of stuffed product, breaking and bursting the film due to the friction and sudden increase in pressure caused by the displacement of the large amount of meat to be separated.

As a result of the slow stuffing in both the manual and the mechanical operation the system productivity is low. This is made worse by the need for frequent stoppages to replace the tube containing the shirred or compressed net due to the limited amount of net that can be loaded on the tube. The piece piercing operation and their manipulation to subject them to a vacuum in order to remove the air simply adds manpower cost to the operation, which in the case of the most automated operation can represent up to a 60% addition to the rest of the operation.

Because of the low accuracy of the manual operation, when this is the case the weight control is poor. When a more or less viscous product made of meat parts is pumped through a large-diameter tube the possibility that one or several meat parts on the open end of the tube fall in the preceding piece introduces an element of weight variation even when the meat corresponding to each piece is independently pushed and controlled by the stuffing machine.

Oscillation in the size of the pieces in the case of the manual system are inherent to the process, while in the case of the mechanical system they are due to the difference in the net traction depending on whether the net tube has just been placed or it is about to run out of net. This difference is due to the different contact area in either case between the net and the tube and is made worse by the high tension to which the net is subjected as a result of the tube diameter.

Other oscillations are produced when loading the nets on the pneumatic loaders, when it is frequent for net portions loaded afterwards to be inserted under the previously loaded net. As the net loaded at the end is the first to be dispensed during the application, the aforementioned covered fragments will be released with greater difficulty, giving rise to short and tightened pieces with a risk of no overlapping and losing meat, or to soft and long pieces when the covered fragments are suddenly released.

Both the films and the elastic nets used to wrap meat products are expensive and constitute an important part of the production cost. Current production systems, whether manual or mechanical, are not optimised as regards using the necessary amount of these materials. In the manual operation case, the waste of material is due t the oscillation in the length of the pieces, often inevitably using more material than is required, as described above, as well as to the excess material wasted on the ends to hold the pieces as they are tightened to provide the necessary tension and clip or staple them. In the case of automatic machines, the latter aspect is controlled better as the length of the ends is controlled by the distance between the separating clamps, although this distance is greater than is necessary and is imposed by the size of the clamps.

The air trapped during the stuffing constitutes one of the most serious drawbacks of these systems. Air trapped in the stuffing is located between the film and the surface of the meat, and given the film characteristics, is not eliminated during cooking. This results in faults of the surface appearance of the products when they are released from the net for their final packaging. This is especially problematic in this type of products, which are expensive and of high quality. The areas in which the air is located are paler in colour than the rest when the products have been smoked, they are recessed and when collagen films are used these have adherence problems. Products affected by this problem must be declassified and sold at a lower price or reprocessed.

The trapped air is incorporated in the product during the stuffing due to the low pressure in which these types of products are stuffed. The air may reach the interior of the wrapping through the space between the film and the stuffing tube. The greater the tube diameter, the greater the perimeter through which the air can enter, and the lower the pressure exerted by t product on the outside opposing the entry of air. In the case of products stuffed with a piston, the stuffing operation pushes all the air in the tube in which the product must be pushed into the film and net assembly, thereby worsening the problem.

To minimise the impact of this problem, he stuffed products are pierced so that air is allowed to escape during the heat process, or previously perforated films are used. In the first case this represents an additional operation that reduces the productivity of the process and that does not solve the problem fully, while the second case may weaken the film, as well as increasing its price.

Another common problem is loss of overlapping. The mechanical problems of the process mean that the overlapping of the longitudinal film ends is frequently lost. When this occurs, the product is not correctly covered by the film, so that meat is lost and problems of many kinds arise, mainly of appearance and adherence to the net, which cannot be later removed without tearing, resulting in poor quality products.

DESCRIPTION OF THE INVENTION

The method and complementary device disclosed by the invention solve the aforementioned drawbacks in a fully satisfactory manner. For this purpose, its essential characteristic is that unlike the cited methods than make the meat pass through large-diameter tubes near the product being stuffed, the tube through which the meat mass is inserted has a small diameter independent of the size of the finished product. The film constituting the inner wrapping, after being shaped from a coil as a cylinder with its longitudinal edges overlapping, is tightly adapted to the small diameter forming for this purpose longitudinal wrinkles or folds uniformly distributed along its circumference. The elastic net that constitutes the outer wrapping, which for an application simultaneous with that of the film has been previously shirred in an external tube concentric to the meat tube, melds with the film on the final part of the latter, externally holding the film and running together with it without being subjected to any significant elastic radial elongation, until after passing through a retaining system that prevents the return of the meat product the double casing is filled by the meat mass that is pushed by the portioning stuffing machine, increasing its diameter while the longitudinal folds unfold and the net tightens until the product reaches the suitable diameter and it is closed by a double staple or clip. As these operations are carried out, the packaged product is evacuated by a conveyor belt placed at the outlet of the stapler or clipping machine while exerting a uniform traction on the double casing until it is dispensed in a controlled fashion. Individual pieces can be separated at the end of the evacuation belt cutting the double casing between the two clips either manually or with an automatic cutting system.

This difference in the diameter of the tube through which the meat is stuffed allows on one hand allows adapting the system to a conventional stuffing-portioning machine and to an also conventional fast double clipper, synchronised for automated operation whose advantages are explained in greater detail hereinafter, and on the other hand the use of net loading tubes with a considerably smaller diameter able to load a substantially greater amount of net by its multilayer shirring that minimises friction and allows a correct unshirring, increasing the autonomy of the system.

In the traditional system the meat is introduced in the double casing, first opening the latter in the form of a pouch to allow the meat to pass. In the system disclosed, it is the meat that makes its way into the casing with the pressure provided by the pumping system of the stuffing machine. This prevents the entry of air from the outside and access on the inside as the tube is always full of meat. In addition, this system facilitates maintaining the overlapping of the film edges throughout the process as it is not extended to its full diameter until its exit from the stuffing tube when it is already protected by the external net.

The method object of the invention is reduced to practice by adding, to a conventional stuffing-portioning machine and a conventional double clipping machine synchronised for automatic operation, a device able to shape into a cylinder a film intended to wrap food products, supplied in the form of a coil, a stuffing tube with a diameter that is considerably smaller than that of the finished product and adaptable to the double fast clipper, a tube with a diameter slightly larger than that of the stuffing tube and concentric to it, meant to contain the suitably shirred net, allowing the film to pass between the tubes, a frame able to support the aforementioned elements to each other, a retaining system to prevent the meat product from returning after it leaves the stuffing tube and a traction and evacuation system for the wrapped products.

This assembly forms a system that can continuously and automatically provide individual pieces with a controlled volume stuffed in a double casing with a film and a net separated by a double clip or staple. The use of a small diameter stuffing tube allows its adaptation to a fast double clipper and its synchronisation with a stuffing-portioning machine. The system admits several diameters of the stuffing tube and the tube containing the net, the film always running between the two, suitably shirred in a longitudinal sense. The smaller the tube diameter the greater the amount of shirred net it can contain, so that the frequency of the stoppage times to restore it is reduced.

When elastic nets are used the pressure transmitted to the inside of the film and net assembly, unlike when a rigid packaging is used, means that the packaging material can swell to the required diameter. This allows controlling the size of the pieces according to the amount of double elastic casing supplied to each one. If the amount of double elastic casing is greater or lesser, longer or shorter pieces will respectively be obtained, with a higher or lower net tension on the meat product.

This amount can be supplied manually, pulling on the double casing during stuffing, or automatically, such as using a conveyor belt with a controlled speed that removes the stuffed products while applying traction on the double casing being stuffed.

DESCRIPTION OF THE DRAWINGS

To complement the description being made and in order to aid a better understanding of the characteristics of the invention, according to an example of a preferred embodiment, this description is accompanied by a set of drawings forming an integral part of it where for purposes of illustration and in a non-limiting sense the following is shown:

FIG. 4 shows the arrangement of the separation clamps of the fast clipping machine in the stuffing position (A) and in the separation positions (B and C).

FIG. 5 shows a sectional view of a detail of the space between the net tubes and the meat, in which the longitudinal folds of the inner film and its overlap area can be seen.

PREFERRED EMBODIMENT OF THE INVENTION

In view of the described figures, provided solely for purposes of illustrating the invention, the scope of which includes other arrangements or designs of the set of components that configure the system and of the individual components, it can be seen that the object of the invention is an automatic method and device for a full stuffing of meat products without air in a film and net that solves the drawbacks of currently used systems, none of which obtains production rates above seven pieces per minute, managing a spectacular improvement in the production rate while saving manpower, double casing, and increasing the quality of the finished products eliminating the trapped air and obtaining an optimum uniformity of shape and weight.

For a better understanding of the system, its component elements and their operation are now described.

Figure 1:
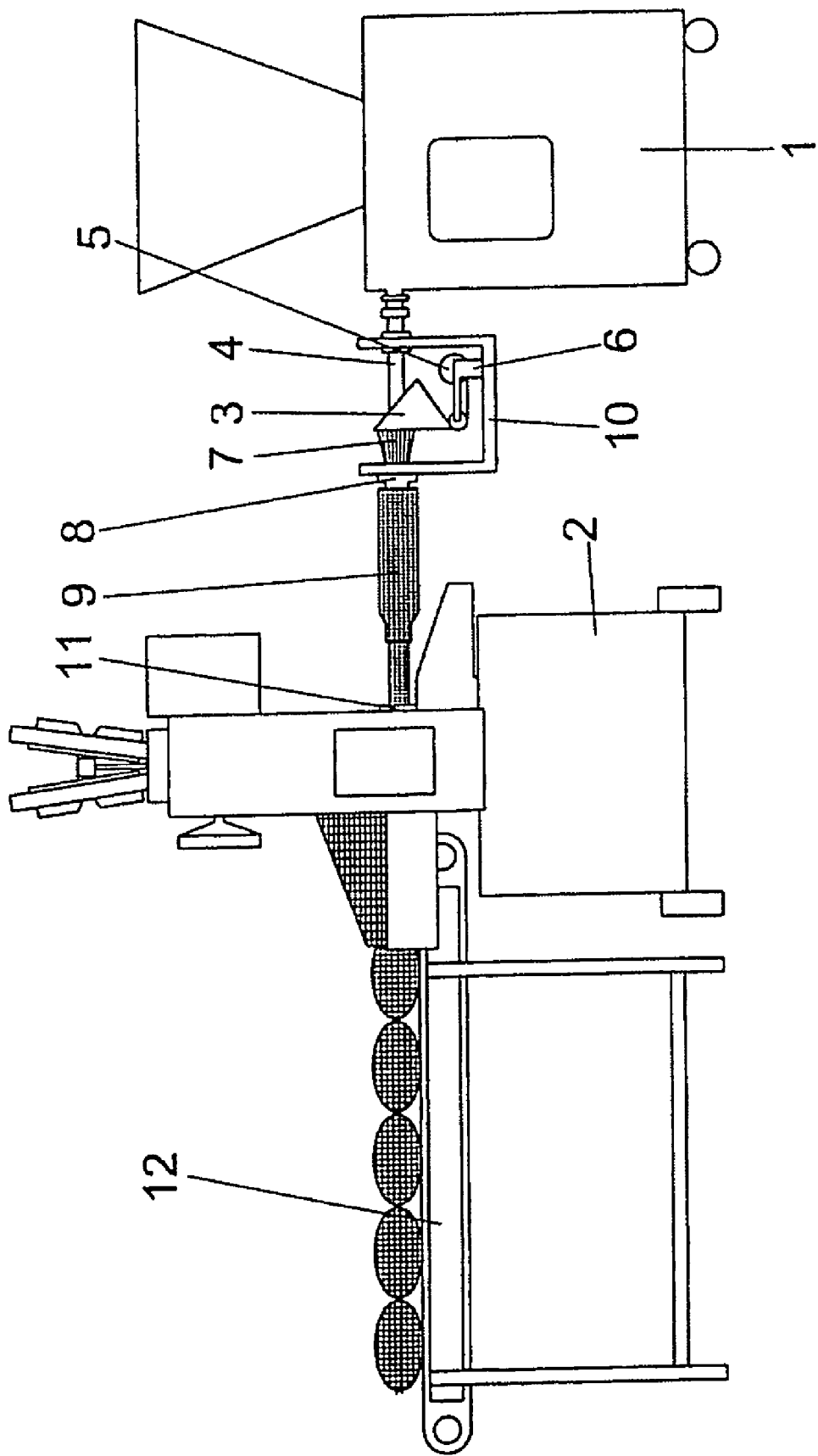
FIG. 1 shows, according to a schematic representation in a side elevation view, a stuffing installation made according to the object of the invention where an adjustable speed conveyor has been added at the outlet of double fast.

A portioning stuffing machine (1) (FIG. 1); this is a commonly used machine in meat industries, and basically consists of a pump that can push and stuff meat mass in the suitable casing either continuously or discontinuously. An automat controls both the impulsion flow rate and the volume impelled each time, thus acting as a dosifier. The machine is provided with a hopper for feeding the meat mass. A vacuum can be applied to both the hopper and the pump body.

Figure 2:
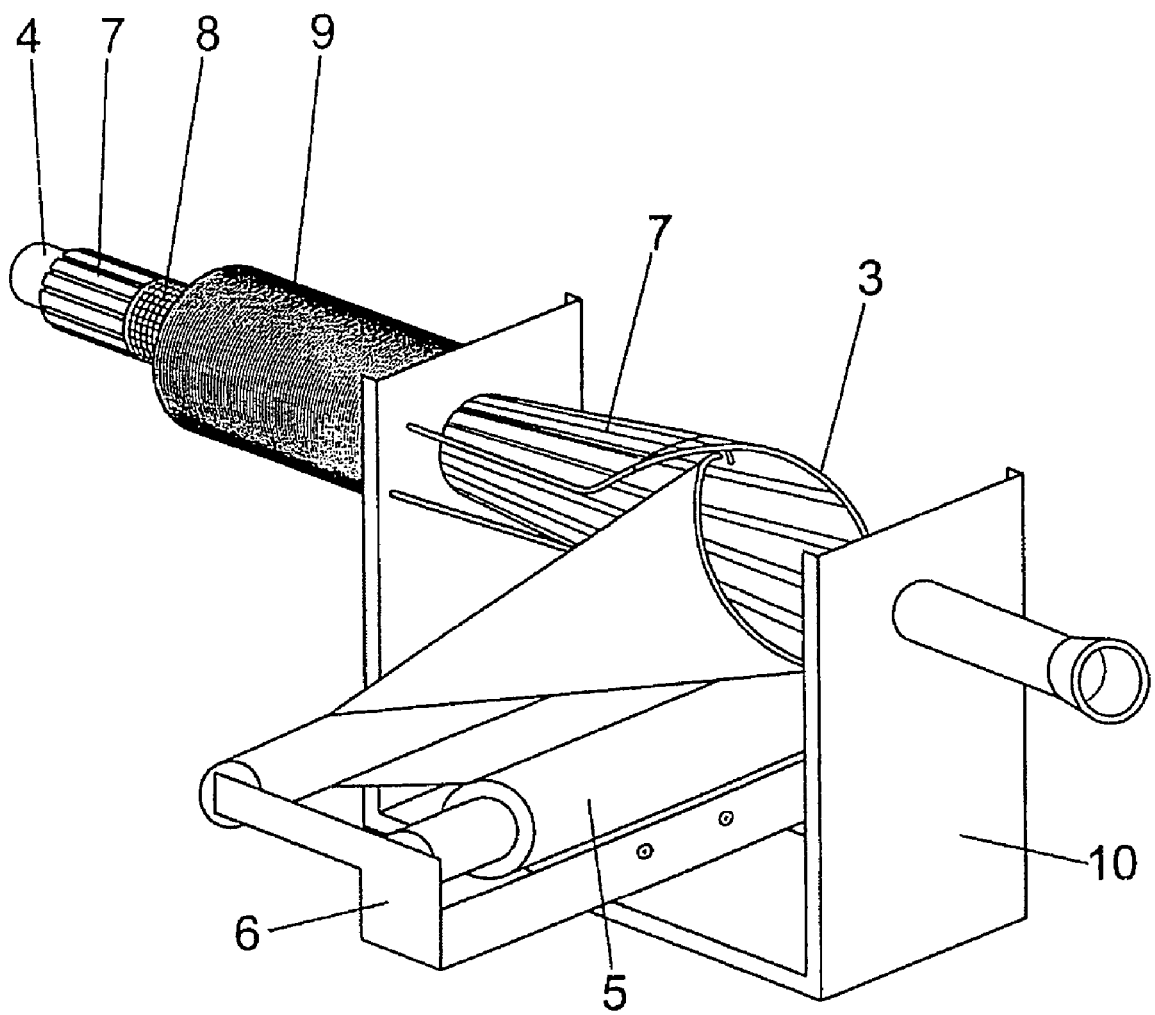
FIG. 2 shows, according to the schematic representation in perspective, a detail of certain elements embodying the method of the invention.

An applicator device for the film and elastic net (FIG. 2). Provided with the same elements as conventional applicators, with the difference that the tube (4) trough which the meat is pushed has a considerably smaller diameter than that used in conventional applicators. This diameter is enough to allow the meat pushed by the stuffing-portioning machine to pass. The first beneficial result of the use of this reduced diameter tube is that the diameter of the tube of the net (8) can be correspondingly reduced and its net loading capacity correspondingly increased.

In order for the recently formed film cylinder to pass with its side edges overlapping through the space between the meat tube and the net, it must form evenly spaced longitudinal folds (7) that remain until the end of the meat tube, as shown in FIG. 5.

The second beneficial consequence of the meat tube with a reduced diameter is that it can be connected to a fast automatic clipping machine prepared for clipping meat pieces in casings with a medium and small diameter, that is common in the meat industries. This allows quickly filling and stapling meat products with a large diameter in a double film and net casing making use of the expansion capacity of the double casing due to the longitudinal folds formed in the film and to the transverse elasticity of the net. This double clipper can be synchronised with the stuffing machine (1) such that when the latter has pushed the programmed amount of meat into the double casing, it stops for a moment to allow the double clipper to suitably staple the recently stuffed piece, immediately repeating the process.

The third positive consequence of the meat tube with a reduced diameter is that it obtains air-free pieces by an intermittent pumping of the meat mass. This allows the tube to be full of meat at all times, preventing air from entering it. In addition, a meat retaining system (11) can be disposed that acts as a barrier to the external air and prevents the meat from moving backwards between the film and the tube, preventing film adherences, dirt and increased resistance to the free flow of the film. Applying this system to large diameter tubes is difficult as the greater perimeter increases friction excessively.

A final beneficial consequence of the reduced diameter stuffing tube is that it simplifies the separation of the pieces from each other so that they all have the same volume and thus the same weight. The greater the tube diameter the greater the variation in the weight of the pieces as it is more likely that a meat part in the separation area falls in one piece or the other at the time of separation. If the tube is small this part is held more firmly and it can more easily be cut by the clamps.

Figure 3:
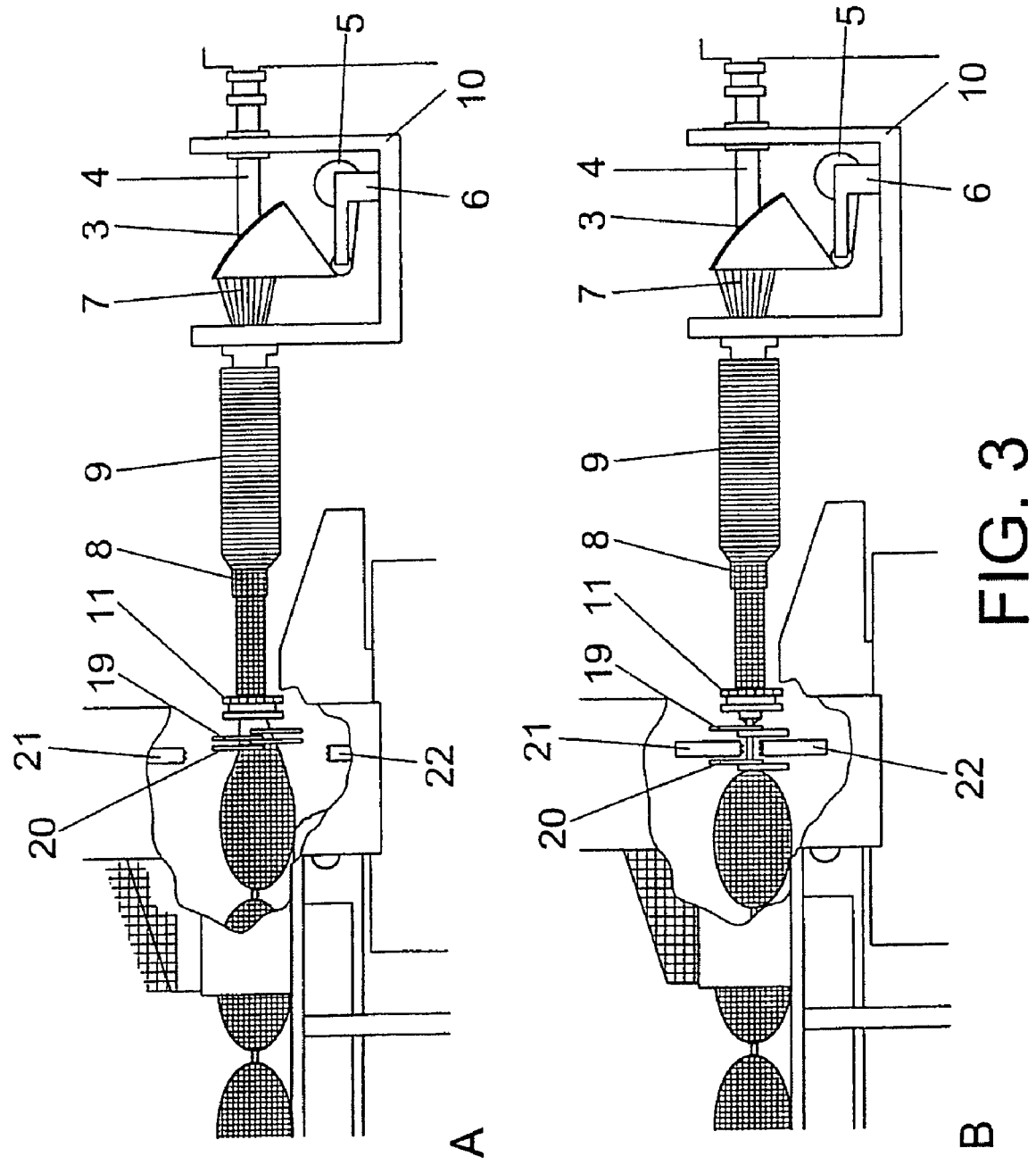
FIG. 3 shows an enlarged detail of FIG. 1, schematically showing the internal operation of the separation and clipping system in two situations. Specifically, situation A shows the system at the time of stuffing and situation B at the time of clipping.

A fast automatic double clipping machine (2). Closes the casing containing the meat product by a simultaneous application of two staples, one at the end of the piece that has just been stuffed and another at the start of the following piece, separated by the minimum space required to allow their application and ensure the closure. The machine also separates one piece from another by a pair of double separation clamps (19) and (20), FIGS. 3 and 4, which strangle the product on the area where it is to be stapled and then separate by the necessary space to allow applying the staples. These machines incorporate a tube through which the meat is made to pass and that is connected to the stuffing machine. In the system of the invention this tube is the reduced diameter tube (4) described previously in the film and elastic net applicator.

A uniform traction and evacuation system. A uniform traction and evacuation is achieved by a conveyor belt (12) placed at the outlet of the clipping machine that receives the pieces uncut and carries them at a controlled speed as they are stuffed. This speed can be constant or intermittent, this is, advancing during the stuffing and stopping when the staple is applied. This facilitates regulating the size of the pieces. In the case of elastic casings size cannot be satisfactorily regulated by a brake or a piece length limiter, as two variables control it, length and diameter, instead of one, length, as in the case of rigid casings. As the object of the system is to stuff pieces with a constant weight and/or volume, the simplest way to ensure pieces of uniform size is to provide each piece with exactly the same amount of double elastic casing. This is achieved by a conveyor belt placed at the outlet of the clipping machine that removes stuffed products at the same speed as the double casing is supplied. The weight of the products ensures the friction needed to prevent slippage, so that the double casing is pulled at a constant speed as the product is stuffed.

One of the great advantages of the system derived of the reduced diameter of the stuffing tube as explained above is that support tubes can be employed for the shirred net whose diameter is also smaller, so that they can contain a much greater amount of net without subjecting it to a high radial tension, also achieving a smoother unshirring due to the lower friction with the tube. Below is explained how the net is shirred in multiple layers on reduced diameter tubes.

Figure 6:
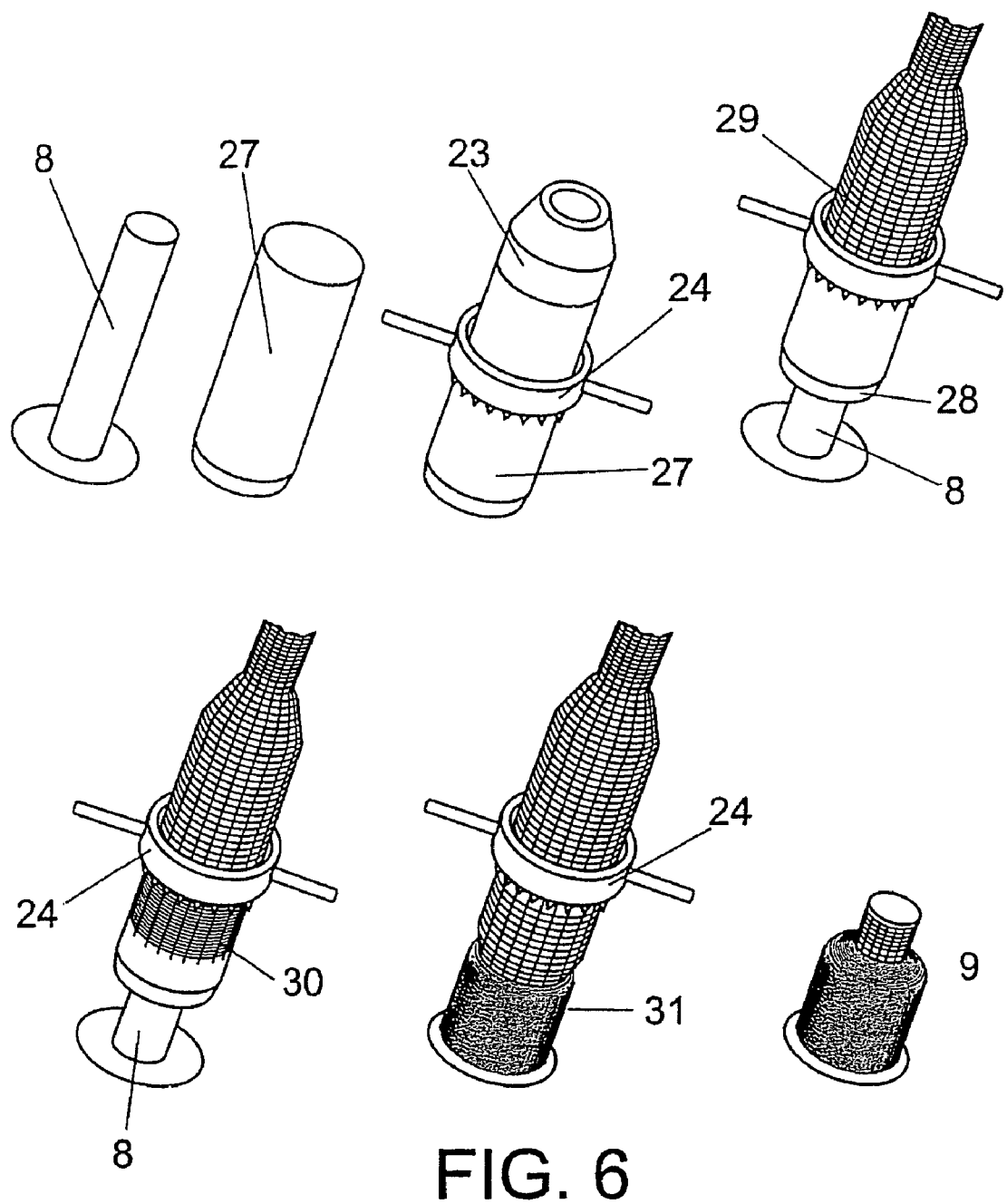
FIG. 6 shows a perspective schematic representation of the elements required in the successive stages of the multilayer net shirring according to the invention.

The multilayer shirring of the net of the invention, FIG. 6, is obtained in a simple manner by the same shirring system of the conventional system using an additional tube (27) that, far from complicating the system simplifies it. The first operations are performed similarly to the conventional system, with the only difference that instead of taking place on the final tube of the net (8), which in this case has a smaller diameter, take place on a transfer tube (27), with a diameter similar to the net tube of the conventional system and a lower end having an area of a few centimetres in the shape of a truncated cone (28) to facilitate transferring the net to the definitive net tube, as will be explained below. After the transfer tube has been suitably threaded with the net (29) and the latter has been trapped in the teeth of the loader, the definitive net tube (8) is placed inside the transfer tube and the net (30) will begin to be pushed towards the bottom end of the net tube, which remains hidden inside the transfer tube showing only the base so that it is held to the stuffing machine, also acting as a bottom stop for the net. When the net reaches the bottom end of the transfer tube it is accumulated in the truncated cone shaped area, such that as soon as the downward pressure ends because the loader begins its upward run the net, due to the special shape of the tube end, falls spontaneously on the net tube. As these operations are successively repeated the inner net tube is orderly loaded with the net (31) and (9) that occupies the entire space included between the lower tube and an imaginary coaxial tube external to the one with a diameter similar to that of the transfer tube. As the inner tube is loaded the transfer tube rises resting on the loaded net, so that all individual loading operations have the same run and load the same amount of net, equivalent to the length of the transfer tube, unlike the traditional method in which as the net is loaded the shirred net is less, thus not allowing to use the entire length of the support tube.

Figure 7:
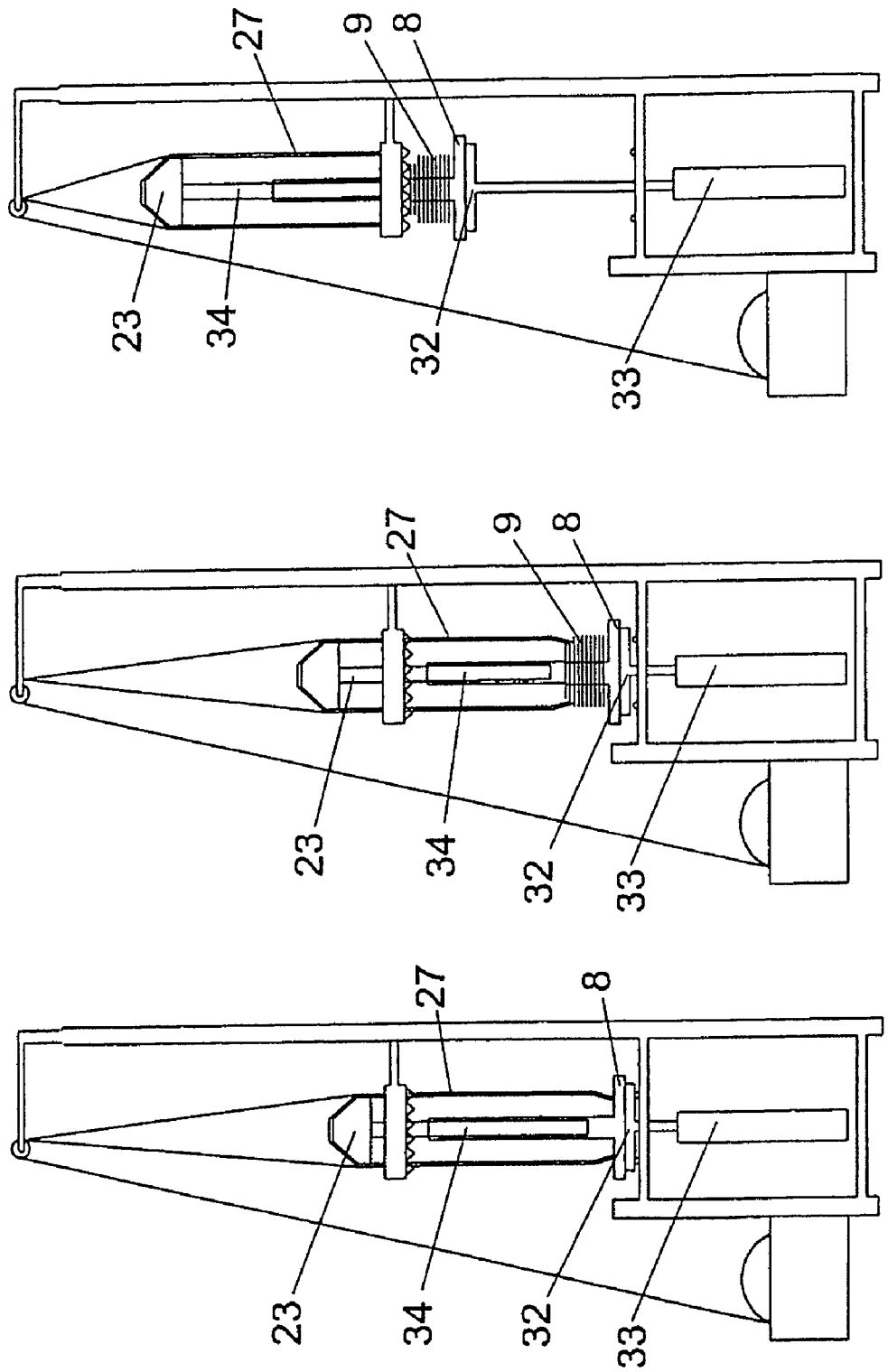
FIG. 7 shows how a conventional net shirring device can be used with the additional use of a transfer tube to shirr the multilayer net on a reduced diameter tube.

FIG. 7 shows how the previously described method relating to the manual shirring method can be applied using the same additional elements, this is, a transfer tube (27), on the conventional net shirring mechanical process, where the net tube (8) is placed on a platform (32) which is alternatively moved up and down by a pneumatic piston (33). The net loader (24) is fixed in this case but its relative motion with respect to the tube and the net is the same as in the manual loading. In this case the transfer tube (27) has an internal guide (34) that is inserted in the net tube to provide rigidity to the system. This inner guide may also be used for manual shirring.

System Operation.

The system of the invention is started after the stuffing machine begins to push the meat through the tube (4), pushing the closed double casing forward. The meat thus fills the portion of double casing supplied, which expands as the longitudinal folds become unshirred and the transverse elastic rings of the net are fully tightened. After the meat corresponding to the piece has been stuffed the stuffing machine automatically interrupts the pumping and the clamps (19) and (20) of the clipping machine close, strangling the double casing and the meat, then opening to displace the meat contained in the space intended for the double staple. At this time the die (21) and the matrix (22) of the double clipper close on the strangled portion of double casing without meat, placing a pair of staples as seen in FIG. 3B. the clamps immediately open and come together as the matrix and die separate to reach the new stuffing position FIG. 3A and the stuffing of the new piece begins. After the first piece has been produced, it is deposited on the conveyor belt so that the belt can pull on the piece to form the second and subsequent pieces. Stuffing of the successive pieces is automatically performed in this manner until the stock of shirred net or film in the coil is exhausted and it is necessary to reload them, restarting the process.

EXAMPLES

The following examples are provided to determine the scope and characteristics of the invention, which are not meant to limit the invention and are included only for purposes of explanation.

They describe the characteristics and parameters of the production of meat products in film and net according to various traditional systems, comparing them in each case to the production of various finished products using the system disclosed in the invention. The most important points to consider in the comparison are the following:

Manpower used

Width and length of the double casing used per piece.

Amount of net loaded per operation

No of pieces stuffed for each net load

Production rate

% of pieces with surface air pockets in the finished product.

EXAMPLE 1

| | Traditional System | Disclosed System |
|---|---|---|
| Equipment | Marlen OPTI 140<br>Marlen COV Portioner<br>Tipper Tie TCM 2250 Pumpable | Handtmann VF 200 (4000 Kg/hora)<br>Poly Clip FCA 3462<br>Disclosed system with 50 mm tube |
| Film | Coffi<br>380 mm coil<br>100 m | Coffi<br>380 mm coil<br>100 m |
| Net | 16/5 20 metre polyester loads | 16/5 43 metre polyester loads |
| Diameter of the meat tube | 100 mm | 50 mm |
| Diameter of the net tube | 120 mm | 62 mm |
| Weight of the pieces produced | 1750 g | 1750 g |
| Length of the pieces produced | 250 mm | 220 mm |
| Diameter of the pieces produced | 104 mm | 110 mm |
| Length of the loose ends after the clips | 2 × 30 mm | 2 × 20 mm |
| Length of casing used per piece | 370 mm | 320 mm |
| N° of stuffed pieces per net load | 54 | 134 |
| Persons used | 1.5 operators | 1 operator |
| Rate in pieces per minute | 6 pieces/minute | 22 pieces/minute |
| % finished pieces with air | 2% | 0% |

EXAMPLE 2

| | Traditional System | Disclosed System |
|---|---|---|
| Equipment | Manual Applicator GAROS H 120 | Handtmann VF 200 (4000 Kg/hour)<br>Poly Clip FCA 3462<br>Disclosed system with 50 mm tube |
| Film | Coffi<br>470 mm<br>100 m | Coffi<br>440 mm<br>100 m |
| Net | 20/3 15 m polyester loads | 20/3 35 m loads |
| Diameter of the meat tube | 120 mm | 50 mm |
| Diameter of the net tube | 142 mm | 62 mm |
| Weight of the pieces produced | 2200 g | 2200 g |
| Length of the pieces produced | 250 mm | 250 mm |
| Diameter of the pieces produced | 120 mm | 120 mm |
| Length of the loose ends after the clips | 2 × 80 mm | 2 × 20 mm |
| Length of casing used per piece | 460 mm | 350 mm |
| N° of stuffed pieces per net load | 32 | 100 |

EXAMPLE 2-continued

| | Traditional System | Disclosed System |
|---|---|---|
| Persons used | 2 operators | 1 operator |
| Rate in pieces per minute | 4 pieces/minute | 18 pieces/minute |
| % finished pieces with air | 1% | 0% |

EXAMPLE 3

| | Traditional system | Disclosed system |
|---|---|---|
| Equipment | Marlen OPTI 140<br>Marlen COV Portioner<br>Tipper Tie TCM 2250 Pumpable | Handtmann VF 200 (4000 Kg/hora)<br>Poly Clip FCA 3462<br>Disclosed system with 50 mm tube |
| Film | Coffi<br>570 mm coil<br>100 m | Coffi<br>570 mm coil<br>100 m |
| Net | 22/3 20 m polyester loads | 22/3 35 m polyester loads |
| Diameter of the meat tube | 120 mm | 50 mm |
| Diameter of the net tube | 142 mm | 62 mm |
| Weight of the pieces produced | 4500 g | 4500 g |
| Length of the pieces produced | 340 mm | 310 mm |
| Diameter of the pieces produced | 144 mm | 150 mm |
| Length of the loose ends after the clips | 2 × 30 mm | 2 × 20 mm |
| Length of casing used per piece | 490 mm | 420 mm |
| N° of stuffed pieces per net load | 40 | 83 |
| Persons used | 1.5 operators | 1 operators |
| Rate in pieces per minute | 6 pieces/minute | 11 pieces/minute |
| % finished pieces with air | 2% | 0% |

EXAMPLE 4

| | Traditional system | Disclosed system |
|---|---|---|
| Equipment | Marlen OPTI 140<br>Marlen COV Portioner<br>Brechteen 2210 C 5" | Handtmann VF 200 (4000 Kg/hora)<br>Poly Clip FCA 3462<br>Disclosed system with 50 mm tube |
| Film | Coffi<br>620 mm coil<br>100 m | Coffi<br>570 mm coil<br>100 m |
| Net | 22/3 15 m polyester loads | 22/3 35 m polyester loads |
| Diameter of the meat tube | 120 mm | 50 mmm |
| Diameter of the net tube | 142 mm | 62 mm |

EXAMPLE 4-continued

|  | Traditional system | Disclosed system |
|---|---|---|
| Weight of the pieces produced | 4500 g | 4500 g |
| Length of the pieces produced | 310 mm | 310 mm |
| Diameter of the pieces produced | 150 mm | 150 mm |
| Length of the loose ends after the clips | 2 × 80 mm | 2 × 20 mm |
| Length of casing used per piece | 540 mm | 420 mm |
| N° of stuffed pieces per net load | 27 | 83 |
| Persons used | 2 operators | 1 operator |
| Rate in pieces per minute | 5 pieces per minute | 11 pieces/minute |
| % finished pieces with air | 1% | 0% |

In view of the above examples, the advantages of the system disclosed in the invention over traditional systems in these specific cases are clear and can be summarised as follows:

Double casing saving: between 13 and 24%.

Reduction of the number of operators needed: between 33 and 50%.

Increase in the working rate: between 220 and 450%

Increase in the number of parts stuffed for each net load: between 207 and 312%.

Reduction of parts with trapped surface air: 100%.

Below are shown comparative data on the examples made with the traditional procedure and with the procedure of the invention, showing the difference between the diameters of the meat stuffing tube and the final product on one hand, and of the net tube and the final product on the other, showing that in the system of the invention the difference in diameters is considerably greater than in the traditional procedure.

| Final prod. diameter (1) | Meat tube diameter (2) | Difference (1 − 2) | Net tube diameter (3) | Difference (1 − 3) |
|---|---|---|---|---|
| Traditional system, patent examples (Values in mm) | | | | |
| 104 | 100 | 4 | 120 | −16 |
| 120 | 120 | 0 | 142 | −22 |
| 144 | 120 | 24 | 142 | 2 |
| 150 | 120 | 30 | 142 | 8 |
| Disclosed system, patent example (Values in mm) | | | | |
| 110 | 50 | 20 | 62 | 48 |
| 120 | 50 | 70 | 62 | 58 |
| 150 | 50 | 100 | 62 | 88 |
| 150 | 50 | 100 | 62 | 88 |

The invention claimed is:

1. A method for producing meat products having a final diameter, by stuffing meat mass in a double casing comprising a film and a net, the method comprising the steps of:
    inserting meat mass into a cylinder formed by the film and surrounded by the net, using a stuffing tube for inserting the meat mass into the cylinder, the stuffing tube (4) having a diameter that is smaller than the final diameter of a meat product; and
    shaping the film (5) into the cylinder for receiving said meat mass through said stuffing tube (4), said step of shaping the cylinder comprising the step of forming longitudinal folds (7), wherein the diameter of the cylinder is adapted to the diameter of the stuffing tube (4) while allowing for radial expansion of the cylinder when said cylinder is fed with meat mass through said stuffing tube (4), by unfolding the folds (7).

2. A method according to claim 1, wherein the film is longitudinally shirred on the stuffing tube.

3. A method according to claim 1, wherein the meat product makes its way inside the double film and net casing, radially expanding until reaching the final diameter.

4. A method according to claim 1, wherein the net is shirred in a multilayer arrangement on a tube whose diameter differs from that of the finished product by more than 18 mm.

5. A method according to claim 1, wherein the film and the net do not reach their full radial expansion until the meat product is inside the double casing.

6. A method according to claim 1, including preventing air from entering the meat product.

7. A method according to claim 1, including preventing the meat product from returning by a retaining system placed at an outlet of the stuffing tube.

8. A method according to claim 1, including providing an automatic product traction and evacuation system for controlling the product size.

9. A method according to claim 1, including automatic separating and clipping or stapling operations that begin before the meat product reaches its final diameter.

10. A method according to claim 1, wherein said stuffing tube has a diameter that is more than 40 mm smaller than the final diameter of the meat product.

11. A method according to claim 1, wherein the longitudinal folds (7) are formed uniformly distributed along the circumference of the cylinder.

12. A method according to claim 1, wherein the film is shaped into a cylinder with longitudinal edges of the film overlapping.

13. A method according to claim 1, wherein the film is shaped from a coil.

* * * * *